July 19, 1949.  R. A. ROBERT  2,476,770
JETTISONABLE SEAT FOR AIRPLANES
Filed Dec. 15, 1945  5 Sheets-Sheet 1

INVENTOR
ROGER AIME ROBERT
BY Haseltine, Lake & Co.
AGENTS

INVENTOR
ROGER AIME ROBERT

July 19, 1949.   R. A. ROBERT   2,476,770
JETTISONABLE SEAT FOR AIRPLANES
Filed Dec. 15, 1945   5 Sheets-Sheet 3
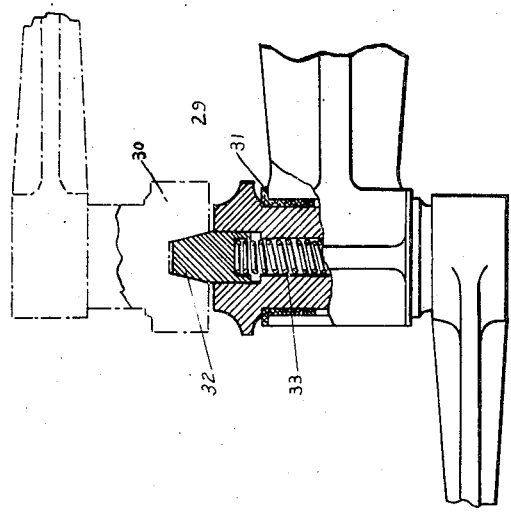
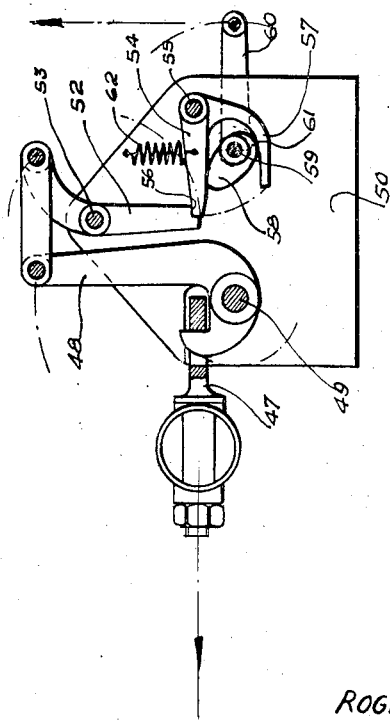
INVENTOR
ROGER AIME ROBERT
BY
Haseltine, Lake & Co.
AGENTS July 19, 1949. R. A. ROBERT 2,476,770
JETTISONABLE SEAT FOR AIRPLANES
Filed Dec. 15, 1945 5 Sheets-Sheet 4
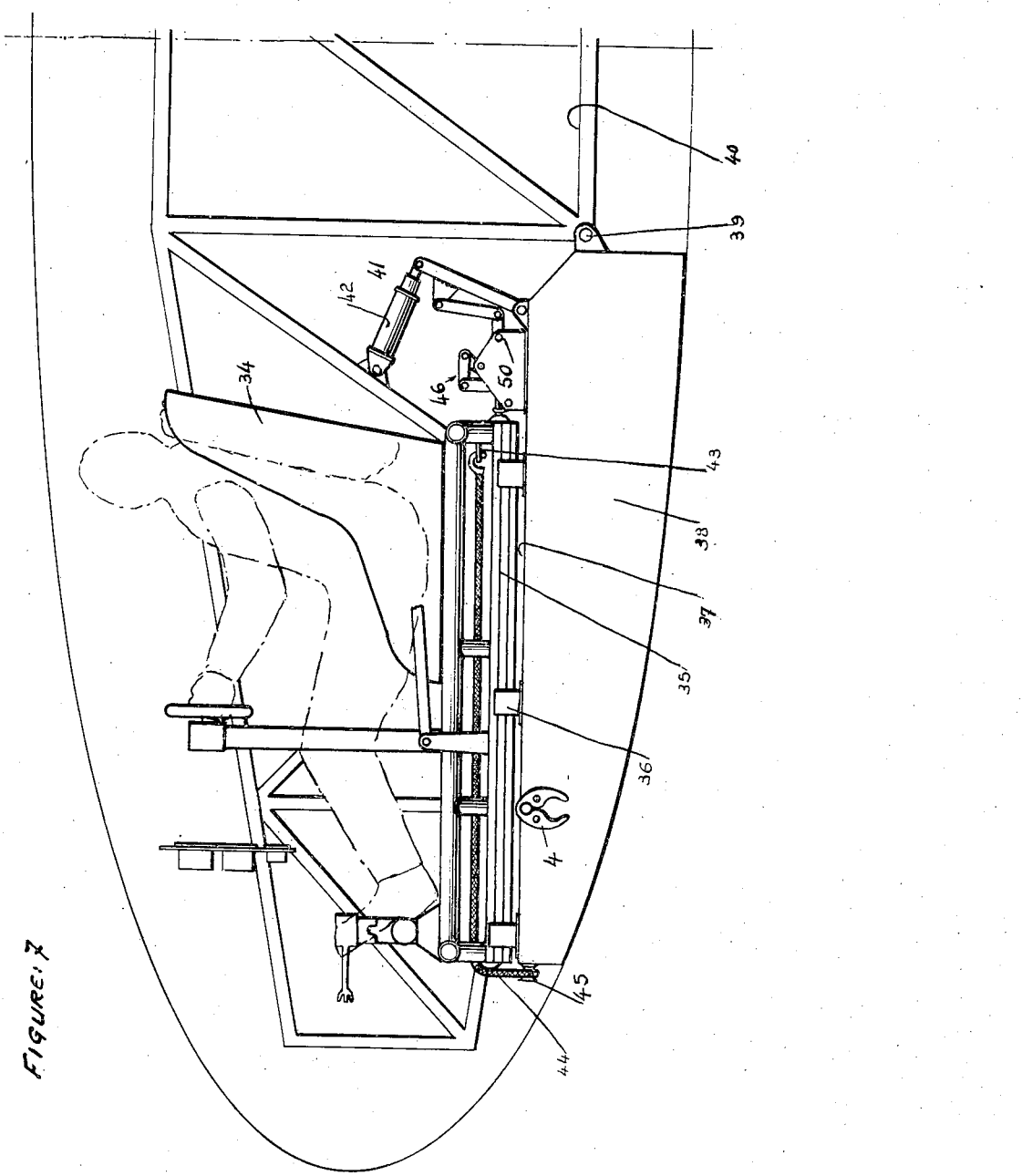
INVENTOR
ROGER AIME ROBERT
BY
Haseltine, Lake + Co.
AGENTS July 19, 1949.  R. A. ROBERT  2,476,770
JETTISONABLE SEAT FOR AIRPLANES
Filed Dec. 15, 1945  5 Sheets-Sheet 5

INVENTOR
ROGER AIMÉ ROBERT
BY
Haseltine, Lake & Co.
AGENTS

Patented July 19, 1949

2,476,770

UNITED STATES PATENT OFFICE 2,476,770

JETTISONABLE SEAT FOR AIRPLANES

Roger Aimé Robert, Boulogne-sur-Seine, France

Application December 15, 1945, Serial No. 635,306
In France September 5, 1942

Section 1, Public Law 690, August 8, 1946
Patent expires September 5, 1962

2 Claims. (Cl. 244—122)

The difficulty for a member of an aircraft crew, for example the pilot, to bail out in case of emergency is known. For instance, the pilot of a fighter must get out of the cockpit by a powerful muscular effort not only to overcome the weight of his body and equipment, but also the air resistance which may be very high.

In any case, until now the pilot or any member of the crew is exposed when bailing out to be hit by a part of the aircraft; this danger is increased when an airscrew is located behind a member of the crew. Such difficulty led often to give up certain designs of aircrafts having a pusher airscrew behind the pilot, though the design may be very satisfactory from the point of view of the performance of the aircraft.

The object of this invention is to eliminate the above defect. This invention relates to an improvement in aircraft cockpit floor essentially characterised by the fact that the cockpit floor is not assembled rigidly to the fuselage or fixed thereto, as it is the usual practice until now, but is detachably mounted relatively to the fuselage, in such a manner that in case of emergency it may be readily and instantaneously moved into a position allowing the member or members of the crew to bail out directly.

According to this invention, the occupant of the cockpit, at the critical instant of bailing out, has no special laborious manoeuvre to perform, but only to depress a button or to pull a handle which has for consequence to detach immediately the cockpit floor from the aircraft and to abandon the pilot in the air.

The cockpit floor may be detached from the fuselage either by gravity or under the positive action of any suitable power means. In some cases, said detachment may be completed by a catapultage out of the fuselage at a certain speed. The members of the crew are thus expelled out of the zone in which they might be hit by any part of the aircraft almost instantaneously; the latter embodiment is specially suitable in the case of aircraft having an airscrew or airscrews of the pusher type.

The following description of the invention, given only as an example, reference is made to the annexed drawing in which:

Fig. 3 is a detail view at a larger scale showing the hinge to the fuselage of the floor supporting the pilot-seat.

Fig. 4 is another detail view showing the locking mechanism in its active position.

Fig. 5 is a detail view similar to Fig. 4 but showing the locking mechanism in its open position.

Fig. 6 shows apart a detachable control connection.

Fig. 7 is a sketch of a second embodiment of the invention.

Fig. 9 is a detailed view showing the control of a catapulting device.

Figure 1:
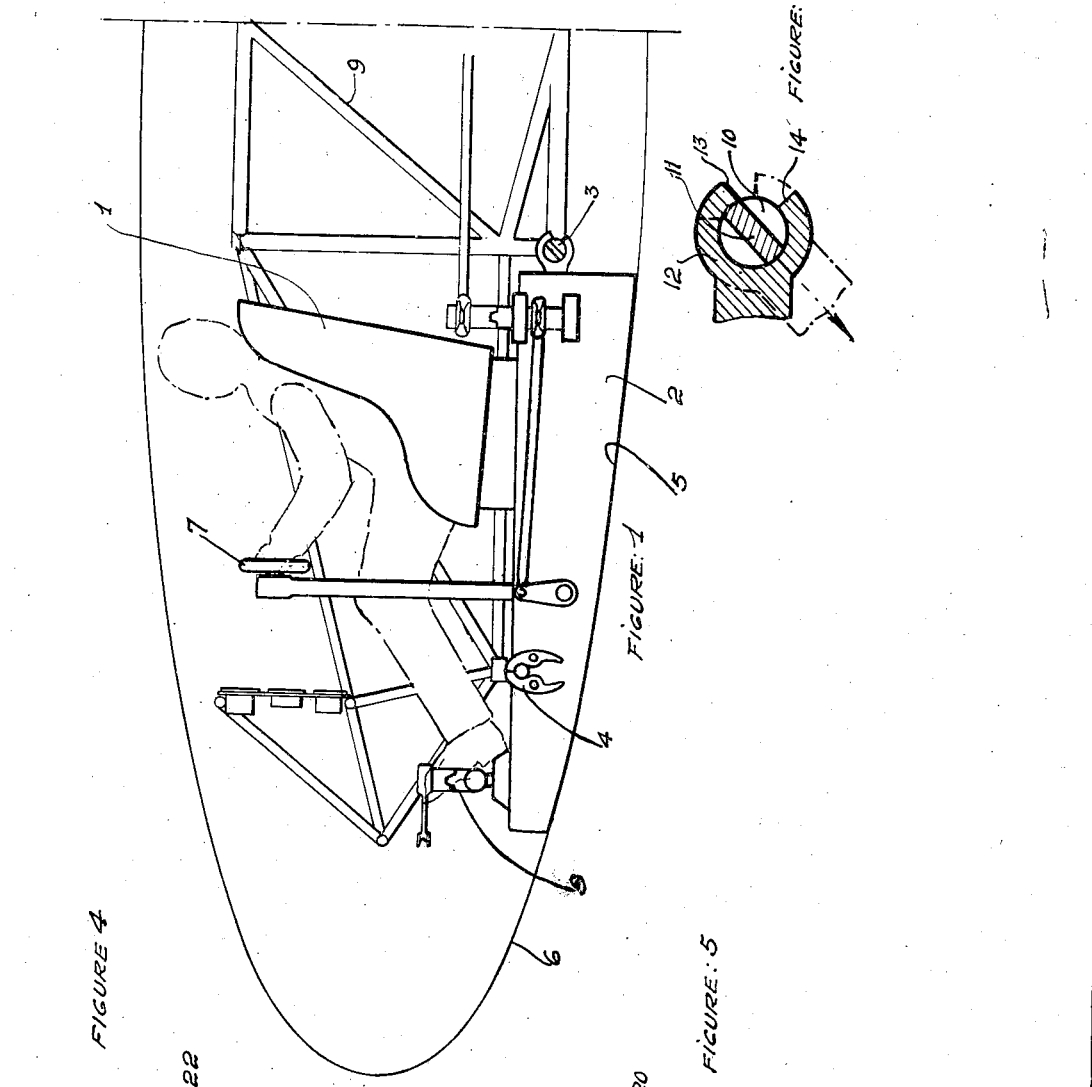
Fig. 1 is a sketch of a cockpit constructed according to the invention, showing diagrammatically in side view a first embodiment of the invention during normal flight.
Figure 2:
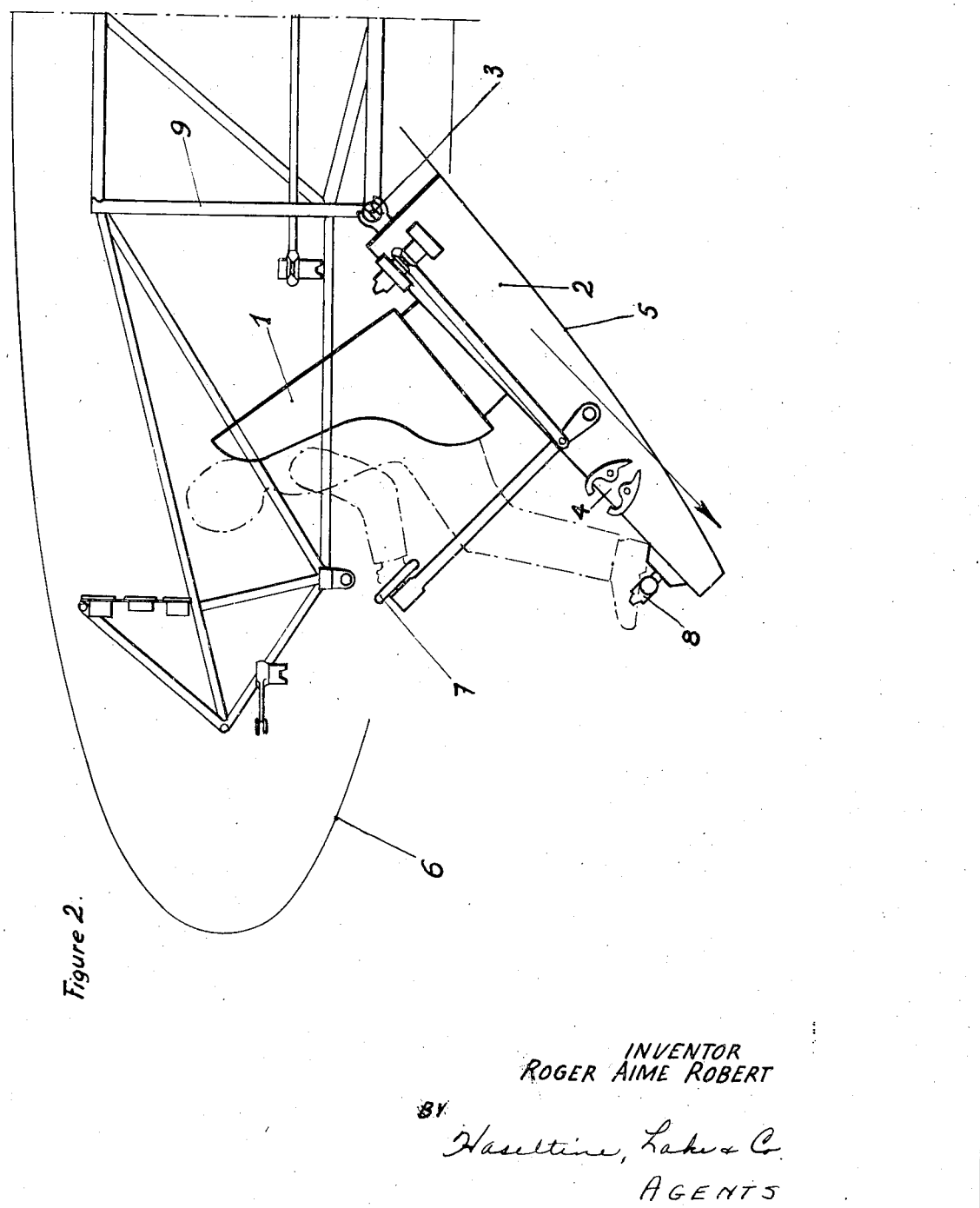
Fig. 2 is a similar view showing the position of the cockpit floor carrying the pilot seat, in which the pilot is ready to bail out.

Referring to Fig. 1 the pilot seat 1 is mounted upon a detachable cockpit floor 2 hinged at its rear end to a shaft 3. A locking mechanism 4 locks the cockpit floor in the position shown in Fig. 1. In said position, the floor bottom skin 5 is flush with the bottom of the fuselage 6 of the aircraft. The pilot is in the normal operating position, the hands on the control wheel or stick 7 and the feet on the pedals 8.

Fig. 3 shows in more detail how the floor 2 is hinged to the frame 9 of the aircraft. Said frame 9 comprises a transversal horizontal shaft 10, each end of which is provided with a flat oblique projection 11. With each of said projection cooperates a open clevis 12 carried at the rear end of the floor 2. The distance between the ends 13 and 14 of each clevis 12 is larger than the thickness between both flat faces of the projection 11. Under such conditions, when the clevis 12 passes from the position shown in full lines in Fig. 3 into the position shown in dotted lines, the floor 2 is freed from shaft 10; the latter position is determined by the slopes of the flat faces of the projections 11.

Figs. 4 and 5 show the details of the locking mechanism 4. Said locking mechanism, arranged on both sides of the floor 2, comprises a transversal rod 15, rigid with the aircraft frame, and a clamp 18 in two parts or jaws 16 and 17 of suitable shape and which are pivotably mounted on spindles 19 and 20 projecting laterally from the floor 2. Under normal conditions, the front part of said floor 2 rests merely upon the rod 15 through the two clamps 18, which are prevented to open by a T-shaped lock 21 pivoted on a pin 22. The lock 21 is constantly kept under the tension of a spring 23 and, under said normal conditions, it is kept into locking position by a trigger 24 which may rotate on a pin 25 and may be actuated at its other end by means of an unlocking control 26. A spring 27 pulls always down on this end of the trigger 24 to maintain it in contact with the lock 21. A stop 28 limits the action of the spring 27.

When the control 26 is pulled upwards, the trigger 24 pivots around its pin 25 against the tension of the spring 27, abandoning thus the lock 21 to the action of its spring 23. This lock 21 pivots then about the pin 22 as shown Fig. 5. The clamp 18, the jaws of which 16 and 17 are no longer retained, opens and under the action of its own weight the floor 2 on which seats the pilot, is tilted around shaft 10. When the inclined position of the floor 2 corresponds to that of the flat slopes of the projections 11, the floor 2 with the pilot is completely disengaged from the aircraft and falls in the airstream.

All the controls fitted in the floor 2 are simultaneously and automatically uncoupled in order to allow for said disengagement of the floor 2 from the aircraft. A form of execution of such a control detachable coupling is shown as example in Fig. 6. The control 29 comprises two parts: a part 30 rigid with the aircraft and a part 31 rigid with the cockpit floor. Both parts are connected together by a tenon and mortise joint 32 kept normally assembled by means of a spring 33. When following the general motion of floor 2, the part 31 is tilted, the tenon is disengaged from its mortise and the parts 30, 31 are automatically disassembled.

Figure 8:
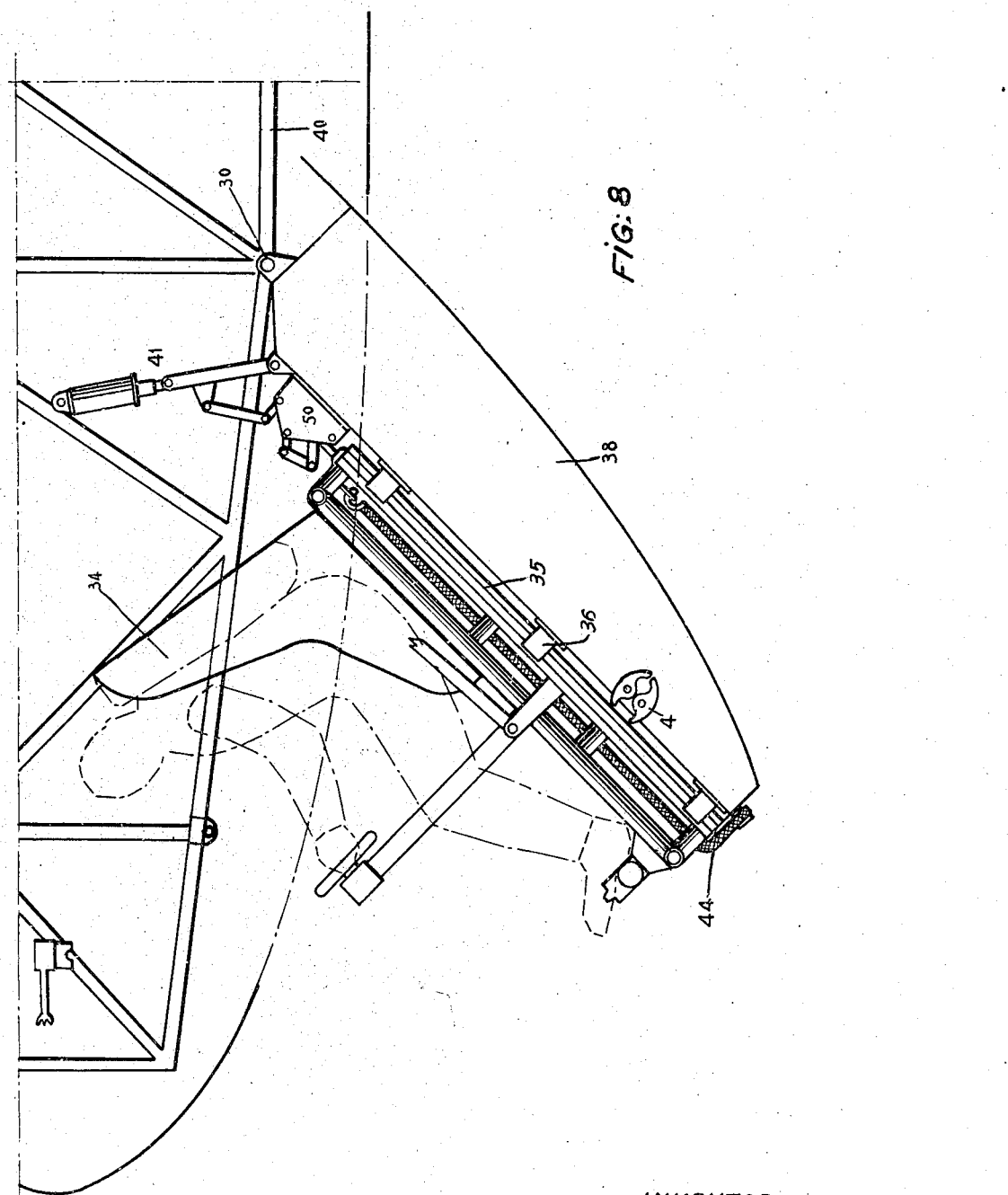
Fig. 8 is a view similar to Fig. 7 showing the cockpit floor tilted to free the pilot, but before the pilot has jumped over.

Referring now to Figs. 7 to 9, showing a second embodiment of the detachable or jettisonable cockpit floor according to the invention, the seat of the pilot 34 is fitted on a slide 35 which may slide, by means of lateral rollers 36, along the upper face 37 of a jettisonable floor 38. The latter floor may rotate at its rear end on shaft 39 rigid with the aircraft framework 40. Furthermore, said floor 38 is attached to the aircraft framework 40 by means of a compass 41 one of the branches 42 of which acts as a shock absorber in order to limit the tilting of the floor 38 about the shaft 39.

The rear end of a sandow 44, guided on rollers 45, fitted at the front end of the floor 38, is hooked to a piston 43 of the carriage 35. Under normal conditions, the carriage 35 is assembled to the floor 38 by means of a locking device 46, the details of which are shown in Fig. 9. Carriage 35 is provided with a hook 47 cooperating with a hook 48 which may rotate on pin 49 rigid with a flange 50 fitted on floor 38. A connecting rod 51 is linked at one end to hook 48 and at the other end to a lever 52 rotating on pin 53 of flange 50. Lever 52 bears against a crank forked lever 54 rotating on pin 55; between the branches 56 and 57 of said fork is fitted an oval cam 58 which may rotate on a pin 59 with which a control lever 60 is rigid, constituting thus the control of the locking device 46. Lever 60 is operated upwards in the direction of the arrow shown Fig. 9.

In case of emergency when the pilot desires to bail out, he operates the locking means 4, freeing thus the front part of the floor 38 which then tilts about shaft 39. During said motion, the branches of compass 41 are straightened and lever 60 is operated.

During the first phase of the motion, the circular portion 61 of cam 58 cooperates with the branch 57 and, accordingly, the locking device 46 is not opened and consequently during the tilting motion of the floor 38, the carriage 35 remains fixed relatively to said floor. Thus the position shown in Fig. 8 is reached, in which the pilot is disengaged from the aircraft structure.

In said position, the branches of compass 41 are coextensive and the circular portion 61 ends and is followed by an eccentric portion having a quickly increasing radius; lever 54 is tilted about pin 55 counter-clockwise against the action of a spring 62 and lever 52 is disengaged, under the traction developed by the sandow 44; hook 48 is tilted about pin 49 and the carriage 35 slides with an ever increasing speed, under the action of the sandow 44 relatively to floor 38. Thus the pilot and its carriage are bailed out at a sufficient speed to avoid any risk of being hit by any part of the aircraft. Floor 38 is not bailed out.

The above described embodiments of the invention cover a cockpit for a single pilot, but it is understood that they may be adapted to any cockpit for one or more members of the crew of an aircraft.

Having now particularly described and ascertained the nature of my invention and in what manner the same is to be performed, I declare that what I claim is:

1. In an aircraft's fuselage, a tiltable trap door, a carriage slidably mounted on said trap door and supporting the pilot's seat, means forcing always the carriage towards the end of the door opposite its pivot pin, retractable means supporting said end of the door, an opening in the fuselage bottom allowing to tilt the door outwards and means to retain the carriage in a locked position until the door is tilted through a determined angle.

2. In an aircraft's fuselage, a tiltable trap door, a carriage sliding on said trap door and supporting the pilot's seat, means forcing always the carriage towards the end of the door opposite its pivot pin, means retractable at will, supporting said end of the door, an opening in the fuselage of the aircraft allowing to tilt the casing outwards, means to lock normally the carriage in its position of rest and means to release the carriage from said locking means only when the door has been fully tilted.

ROGER AIMÉ ROBERT.

REFERENCES CITED

The following references are of record in the file of this patent:

UNITED STATES PATENTS

| Number | Name | Date |
|---|---|---|
| 1,254,947 | Uttz | Jan. 29, 1918 |
| 1,814,325 | Miyasaki | July 14, 1931 |
| 1,899,104 | Ocker | Feb. 28, 1933 |
| 2,120,477 | Adams | June 14, 1938 |
| 2,196,546 | Bowers | Apr. 9, 1940 |
| 2,346,977 | La Sha | Apr. 18, 1944 |
| 2,358,603 | Southerland | Sept. 19, 1944 |